(12) United States Patent
Moy

(10) Patent No.: US 8,235,775 B1
(45) Date of Patent: Aug. 7, 2012

(54) BONE SPLITTING AND BREAKING TOOL

(76) Inventor: Yuey S. Moy, McLean, VA (US)

( * ) Notice: Subject to any disclaimer, the term of this patent is extended or adjusted under 35 U.S.C. 154(b) by 0 days.

(21) Appl. No.: 13/291,603

(22) Filed: Nov. 8, 2011

(51) Int. Cl.
*A22C 25/00* (2006.01)

(52) U.S. Cl. .................................................. 452/160

(58) Field of Classification Search ............. 254/21, 254/25, 26 R, 18, 134, 113, 139, 120–122, 254/131.5, 28; 30/169, 170, 172
See application file for complete search history.

(56) References Cited

U.S. PATENT DOCUMENTS

| | | | | |
|---|---|---|---|---|
| 425,526 | A * | 4/1890 | Seymour | 254/25 |
| 466,066 | A * | 12/1891 | Sheldon | 254/25 |
| 684,426 | A * | 10/1901 | Harvey | 254/131 |
| 1,517,591 | A * | 12/1924 | Shook | 254/131 |
| 2,511,175 | A * | 6/1950 | Pearson | 254/131 |
| 3,879,015 | A * | 4/1975 | Krantz | 254/131 |
| 5,447,289 | A * | 9/1995 | Callahan | 254/131 |
| 5,453,043 | A | 9/1995 | Monson | |
| 5,690,548 | A | 11/1997 | Jones et al. | |
| 6,280,312 | B1 | 8/2001 | Elrod et al. | |
| 7,578,731 | B1 | 8/2009 | Moore | |
| 8,117,702 | B2 * | 2/2012 | Woolley et al. | 7/146 |
| 2005/0227601 | A1 | 10/2005 | Whetstone et al. | |

* cited by examiner

*Primary Examiner* — Richard Price, Jr.
(74) *Attorney, Agent, or Firm* — Nixon & Vanderhye P.C.

(57) ABSTRACT

A bone breaking or crushing tool for use by a hunter is designed to break the pelvic bone of a game animal. The bone breaking tool includes a U-shaped body having first and second arms joined by a front end. A handle projects at an angle from an outer side of a first arm of the U-shaped main body. A projection is formed on an inner side of the first arm of the U-shaped main body. The bone breaking tool is configured so that the first and second arms of the U-shaped main body can be slid around either side of a portion of the pelvic bone of a game animal. A hunter can then apply a force to an end of the handle to drive the projection on the inner side of the first arm into the pelvic bone to break or crush the pelvic bone.

19 Claims, 6 Drawing Sheets

BONE SPLITTING AND BREAKING TOOL

BACKGROUND OF THE INVENTION

The invention relates to a pelvic bone splitter or breaking tool. The tool is primarily used to sever or split/break the pelvic bone of game animals such as deer. Splitting the pelvic bone opens the body cavity of the animal to facilitate the removal of digestive and excretory organs.

Hunters typically field-dress game animals near where the prey is felled. Failure to empty the body cavity of digestive and excretory organs promptly can cause the meat to have a strong, gamey taste or smell. However, hunters must take care not to cut or puncture any of those organs. Those organs contain contaminants such as urine, feces, or digestive fluids that can contaminate the meat.

Hunters often use hunting knives to field dress their game. While practical and convenient, hunting knives are generally ineffective for severing large bones. The obstacle presented by the pelvic bone often causes a hunter to unintentionally cut or puncture an organ, exposing the meat to contaminants.

Because splitting the pelvic bone reduces the risk of accidental contamination, hunters employ various tools and methods to split the pelvic bone. Some try to cleave the bone using an axe. Others use a rock to strike the back edge of a knife blade while holding the sharpened edge against the bone. Still others use saws. Each of those tools and methods has drawbacks.

Using a rock to strike a knife blade is both dangerous and difficult. Personal injury or inadvertent contamination may occur. An axe is cumbersome, heavy, and sharp. Simply carrying an axe suitable for the job while hunting is undesirable. Further its use could also lead to personal injury or inadvertent contamination. A saw is safer to use, but may still lead to inadvertent contamination. Using a saw is slow and requires substantial effort. It is also sharp and cumbersome to carry.

Pelvic bone splitting tools that rely on impact from an integral sliding weight are safer and more effective. Their main disadvantage, however, is the weight of the tool. To deliver a blow sufficient to sever a pelvic bone, the weight must be substantial. The substantial weight can be a burden for a hunter to bear.

DETAILED DESCRIPTION OF PREFERRED EMBODIMENTS

A pelvic bone breaking tool embodying the invention provides a number of features to assist a hunter in field dressing game, such as deer. The tool may include a generally U-shaped main body, with a projection that is designed to bear against the pelvic bone of the game animal. A handle extends away from the main body at an angle. When the tool is positioned so that the pelvic girdle of the game animal is within the aperture of the U-shaped main body, the user can push downward on the handle to force the projection against the pelvic bone. When sufficient force is applied to the handle, the projection will break the pelvic bone.

Figure 1:
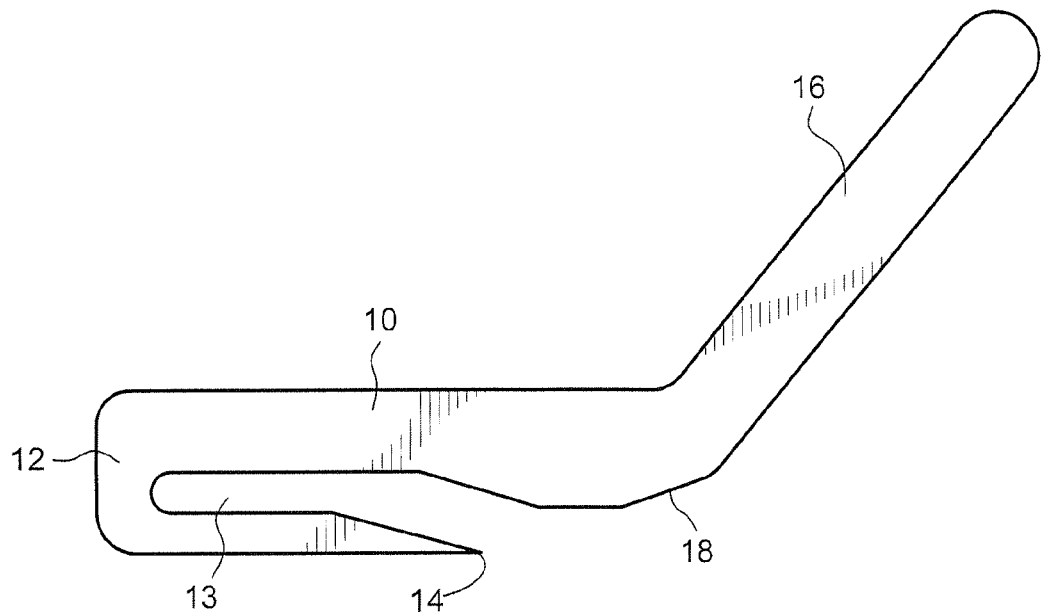
FIG. 1 is a top view of a first embodiment of a pelvic bone breaking tool.

A first embodiment of the tool is illustrated in FIG. 1. As shown therein, the tool includes a U-shaped main body 10. The two arms of the U-shaped main body 10 are joined by a front end 12, and an aperture 13 is formed between the two arms of the main body 10. A handle 16 extends away from the main body 10 at an angle.

A projection 18 is located on the rear end of one arm of the U-shaped main body 10 adjacent a location where the handle 16 joins the main body 10. A pointed tip 14 is located at the rear end of the other arm of the U-shaped main body 10.

To use the tool, the hunter would position the tool such that the pelvic bone is received in the aperture 13 between the two arms of the U-shaped main body 10. The projection 18 would bear against approximately the center of the pelvic bone of the game animal. The hunter would then push downward on the handle 16 to drive the projection 18 into the top of the pelvic bone and to thereby break the pelvic bone.

The tool can be positioned against the pelvic bone of the game animal in multiple different ways. The tool could be positioned so that the projection 18 bears against the top of the pelvic bone, or it could be positioned so that the projection bears against the underside of the pelvic bone. Also, the tool could be positioned so that the handle 16 extends rearward or forward.

Figure 2:
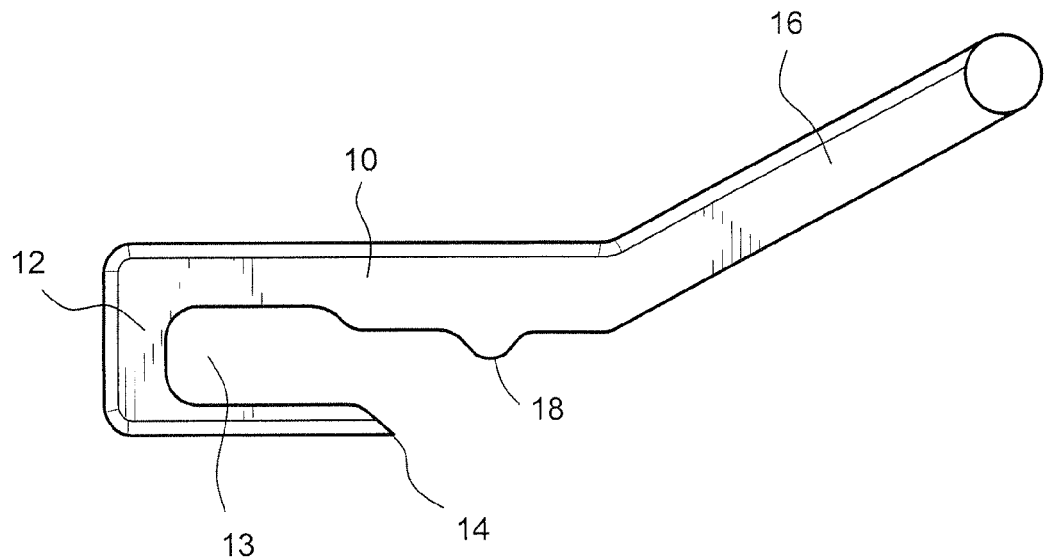
FIG. 2 is a top view of a second embodiment of a pelvic bone breaking tool.

A second embodiment of the tool is illustrated in FIG. 2. In this embodiment, the projection 18 comes to a sharper point and extends further away from the aim upon which it is formed.

Figure 3:
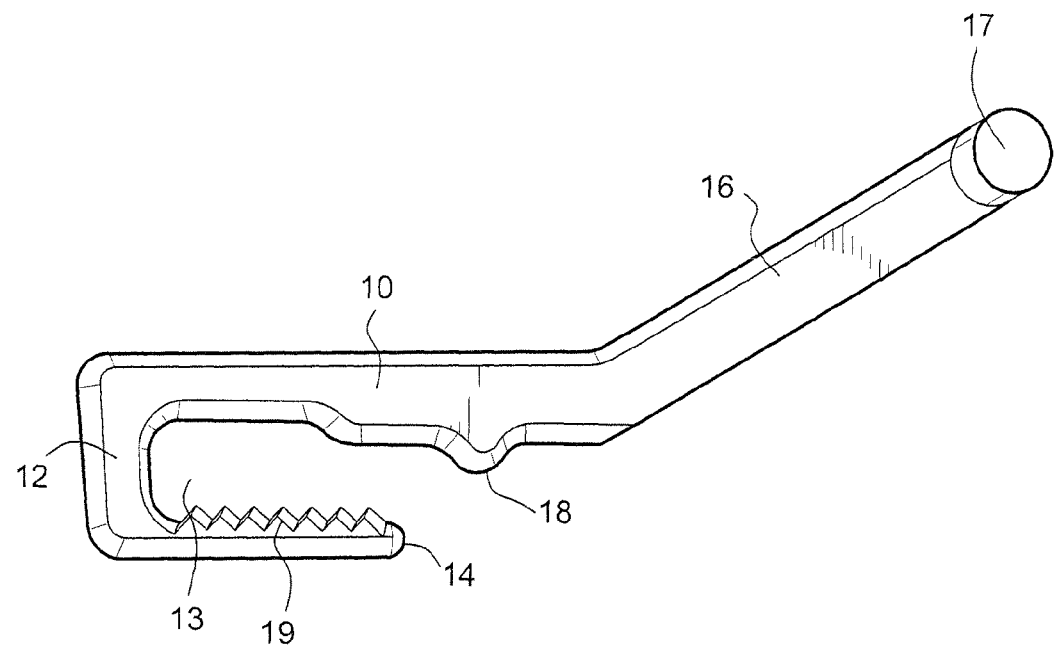
FIG. 3 is a top view of a third embodiment of a pelvic bone breaking tool.

A third embodiment of the tool is illustrated in FIG. 3. In this embodiment, serrated teeth 19 are formed on the atm of the U-shaped body 10 opposite the projection 18. The serrated teeth 19 are designed to provide a better grip so that the tool does not slip when in use. Although the embodiment illustrated in FIG. 3 shows serrated teeth 19 on the lower arm opposite the projection 18, serrated teeth could also be provided on the upper arm. The teeth could have any form other than the ones shown in FIG. 3. In addition, structures other than teeth could also be formed on the lower and/or upper arm, so long as the structures increase the ability of the tool to grip and not slip while in use. For example, a series of pointed protrusions could be provided instead of teeth.

The third embodiment also includes a projection 17 formed at the end of the handle 16. The projection 17 extends from the end of the handle 16 in a direction that is substantially perpendicular to the longitudinal axis of the handle 16. The projection 17 provides a broad surface that can rest across the palm of a user's hand as the user is pushing down on the handle 16. Thus, the projection 17 makes it easier and more comfortable for the user to apply significant force to the end of the handle 16.

Figure 4:
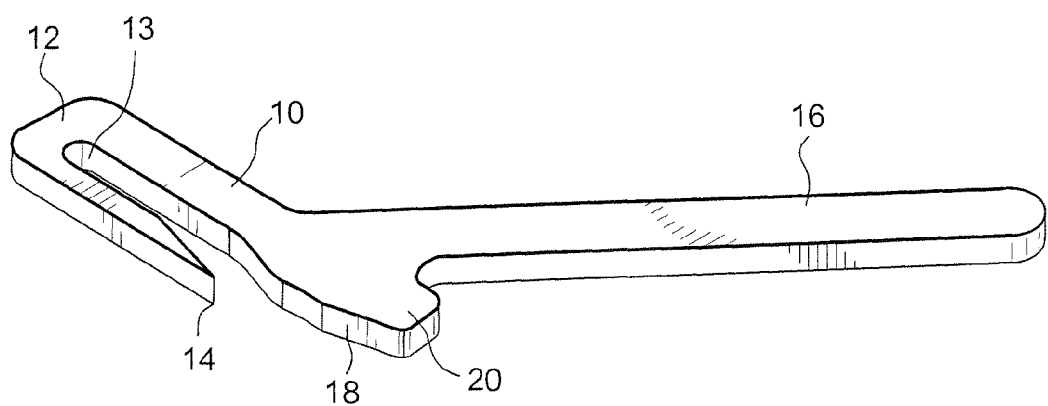
FIG. 4 is a perspective view of a fourth embodiment of a pelvic bone breaking tool.
Figure 5:
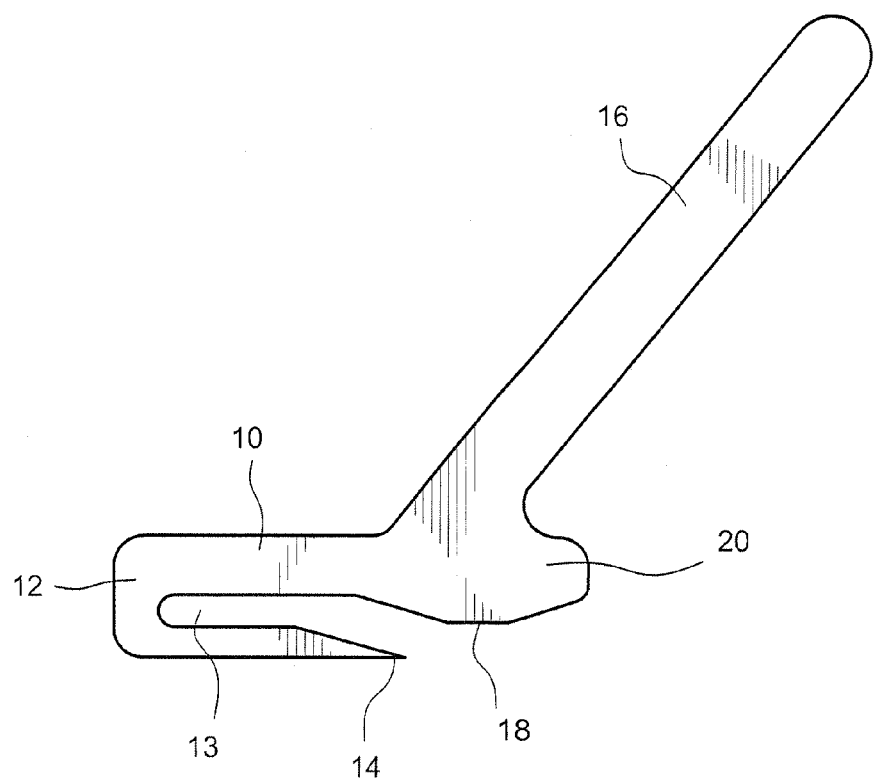
FIG. 5 is a top view of the fourth embodiment of a pelvic bone breaking tool.

A fourth embodiment of the tool is illustrated in FIGS. 4 and 5. In this embodiment, the projection 18 is formed on a rearwardly extending portion 20 that projects backward from the U-shaped main body 10, and behind the point at which the handle 16 joins the U-shaped main body 10.

Figure 6:
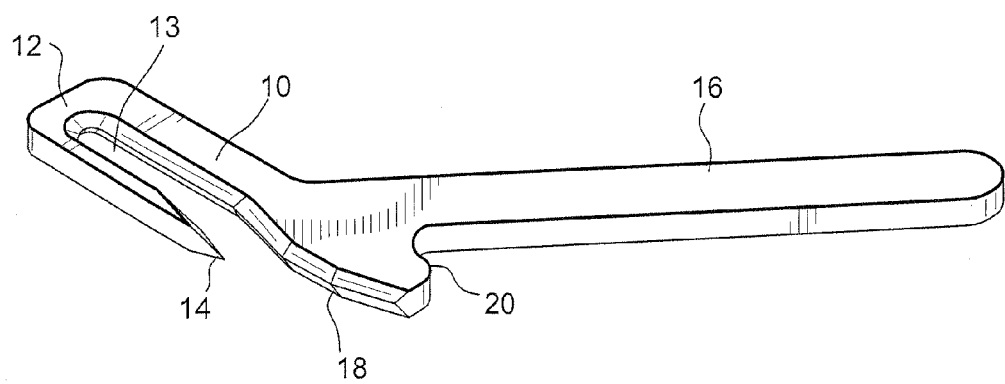
FIG. 6 is a perspective view of a fifth embodiment of a pelvic bone breaking tool.
Figure 7:
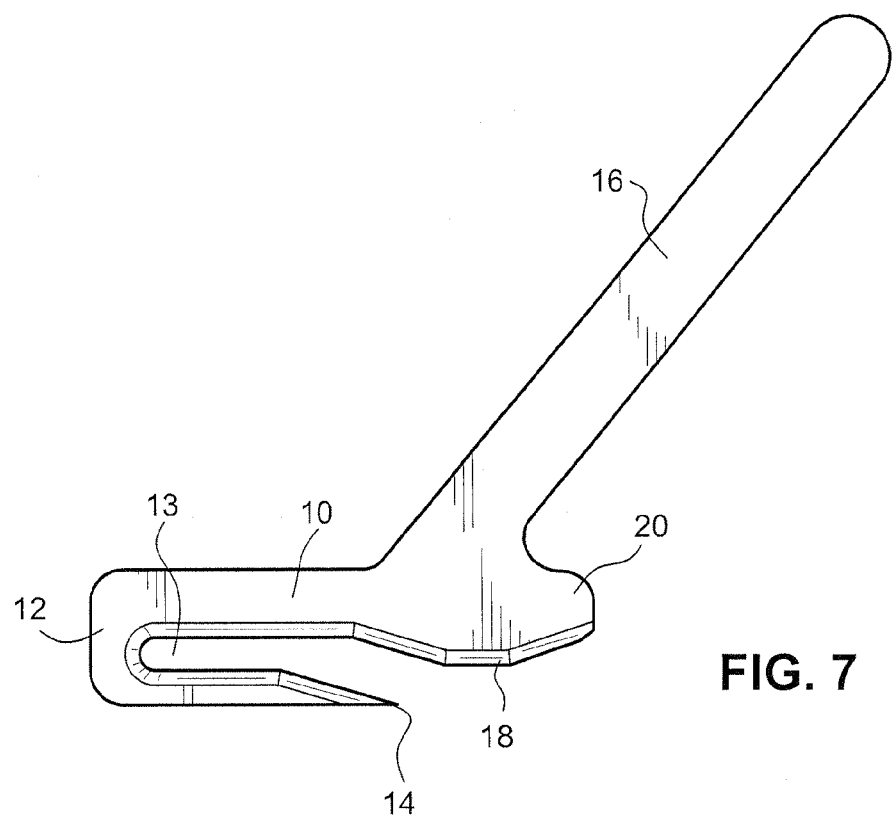
FIG. 7 is a top view of the fifth embodiment of a pelvic bone breaking tool.

A fifth embodiment of the tool is illustrated in FIGS. 6 and 7. This embodiment is similar to the fourth embodiment illustrated in FIGS. 4 and 5, however, the inner surfaces of the arms of the U-shaped main body 10 and the projection 18 are angled to form a ridge or a point at the center of those elements. Angling these surfaces may help to prevent slippage of the tool in use. Also, angling these surfaces increases the force per unit of area that is applied to the portions of the game animal engaged by the surfaces.

Figure 8:
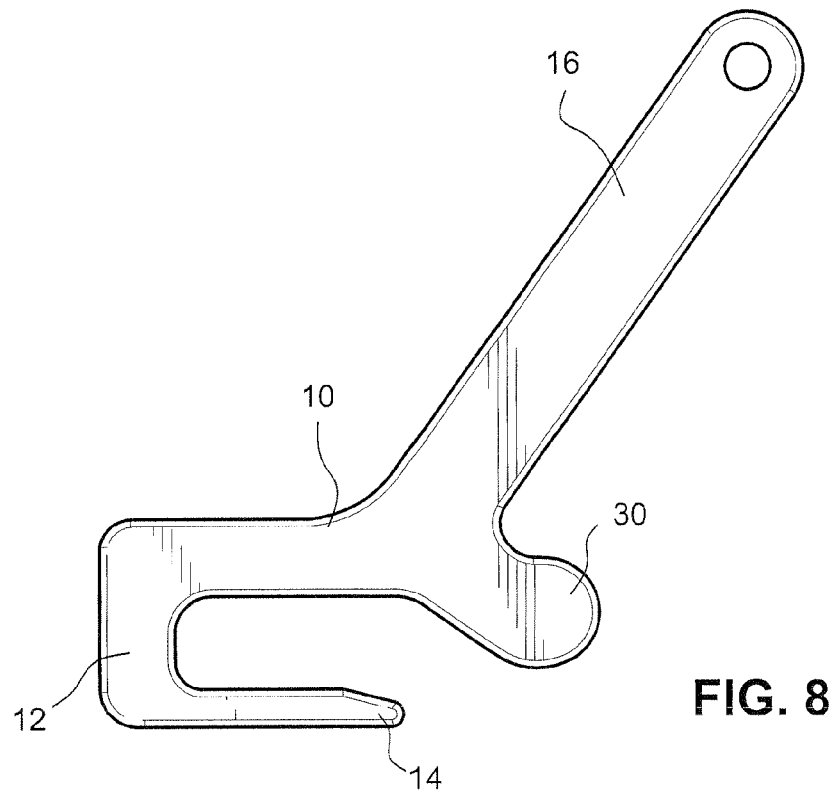
FIG. 8 is a top view of a sixth embodiment of a pelvic bone breaking tool.

FIG. 8 illustrates a sixth embodiment of the tool. In this embodiment, the handle 16 is joined to an end portion of one of the arms of the U-shaped main body 10. However, the tool includes a large rounded knob 30 that extends rearward from the point at which the handle 16 joins the U-shaped main body 10. The rounded knob 30 also extends rearward and downward from the first arm of the U-shaped main body toward the opposite arm.

Figure 9:
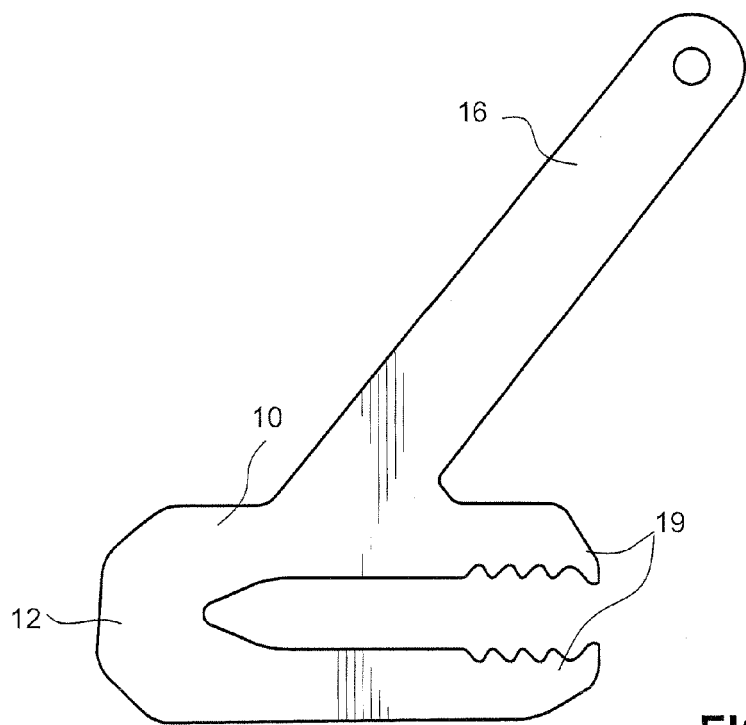
FIG. 9 is a top view of a seventh embodiment of a pelvic bone breaking tool.

FIG. 9 illustrates a seventh embodiment of the tool. In this embodiment, the handle 16 is joined to a center portion of the main body 10. Also, the two arms of the U-shaped main body are substantially the same length, and serrated teeth 19 are formed on both arms of the U-shaped main body 10. Because the handle 16 is joined to a central portion of the U-shaped main body 10, the overall length of the tool is shorter than the other embodiments discussed above, which may make it easier for a hunter to pack and/or carry the tool.

Figure 10:
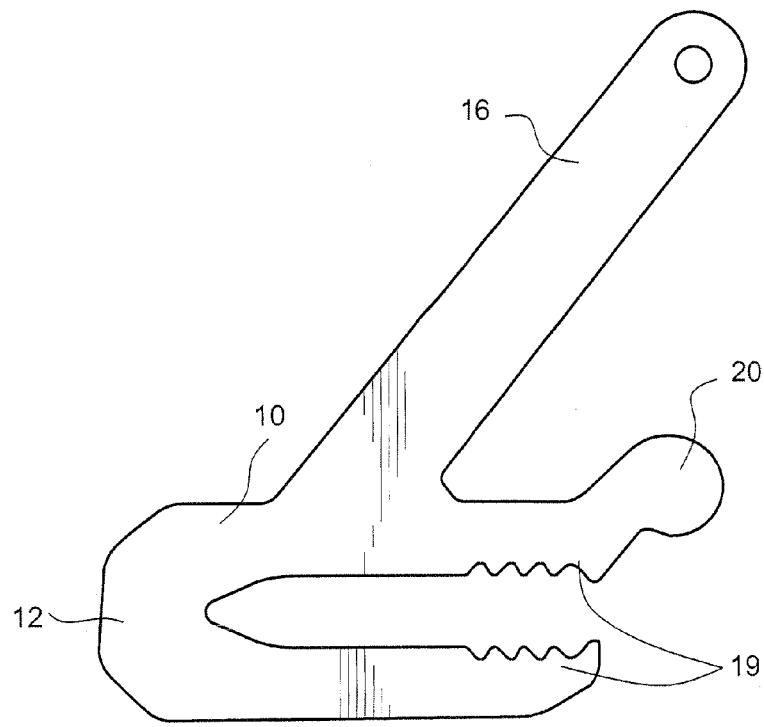
FIG. 10 is a top view of an eighth embodiment of a pelvic bone breaking tool.

FIG. 10 illustrates an eighth embodiment of the tool. This embodiment has a U-shaped main body 10 with approximately equal length arms. Also, the handle 16 is joined to a central portion of the U-shaped main body 10, similar to the seventh embodiment illustrated in FIG. 9. This embodiment also includes teeth 19 on inner surfaces of both arms of the U-shaped main body 10. However, this embodiment also includes a rounded knob 20 that extends rearward from the U-shaped main body 10. Unlike the embodiment illustrated in FIG. 8, the rounded knob first extends upward toward the handle 16, and then the rounded knob 20 extends back downward.

Figure 11:
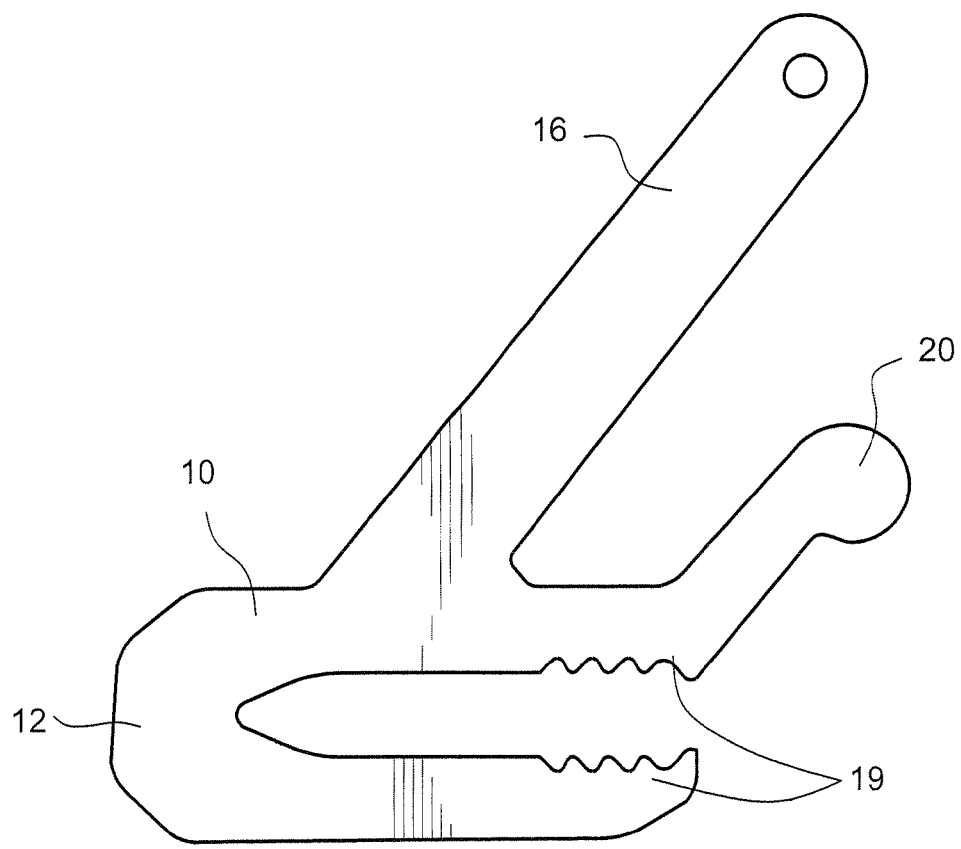
FIG. 11 is a top view of a ninth embodiment of a pelvic bone breaking tool.

FIG. 11 illustrated a ninth embodiment of the tool. This embodiment is similar to the eighth embodiment discussed above, however, the rounded knob extends farther rearward and upward before turning back downward.

A tool as illustrated in FIGS. 1-11 can be formed of any suitably rigid material. Preferably, the tool is formed of metal. Depending on the strength of the metal, the tool can be formed to varying thicknesses. Also, the dimensions of the tool can be altered to suit the game animal upon which the tool is used. Thus, multiple different sized tools could be carried by a hunter to deal with multiple different sized game animals.

Because of the unitary construction of the tool, the tool is compact and light in weight. Also, there are no moving parts that can break. These factors make the tool relatively inexpensive to produce, easy to carry, and durable.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A tool to be used by a hunter for cutting, breaking or crushing a bone of a game animal, comprising:
    a U-shaped main body having first and second arms joined by a front end;
    a handle that projects from an outer side of an end of the first arm that is located opposite from the front end; and
    a projection formed on an inner side of the first arm.

2. The tool of claim 1, wherein the U-shaped main body is configured to receive a pelvic bone of a game animal such that the tool can be used to break the pelvic bone.

3. The tool of claim 1, wherein the handle extends at an angle from the outer side of the first arm of the U-shaped main body and in a rearward direction away from the front end.

4. The tool of claim 3, wherein an angle formed between a longitudinal axis of the first arm of the U-shaped main body and a longitudinal axis of the handle is between approximately 120° and 150°.

5. The tool of claim 1, wherein the first arm of the U-shaped main body is longer than the second arm of the U-shaped main body, and wherein the projection is formed on a portion of the first arm that extends beyond an end of the second arm.

6. The tool of claim 1, wherein an end of the second arm of the U-shaped main body is pointed.

7. The tool of claim 1, wherein raised elements configured to provide friction are formed on an inner side of the second arm of the U-shaped main body.

8. The tool of claim 1, wherein an inner side of the projection is angled such that the inner side of the projection forms a ridge or a point.

9. The tool of claim 8, wherein an inner side of the first arm of the U-shaped main body is angled such that the inner side of the first arm forms a ridge.

10. The tool of claim 1, wherein a projection is formed at an end of the handle, the projection extending in a direction perpendicular to a longitudinal axis of the handle.

11. The tool of claim 10, wherein the projection extends from opposite sides of the end of the handle.

12. The tool of claim 1, wherein the first arm of the U-shaped main body is longer than the second arm of the U-shaped main body.

13. A tool to be used by a hunter for cutting, breaking or crushing a bone of a game animal, comprising:
    a U-shaped main body having first and second arms joined by a front end;
    a handle that projects from the U-shaped main body;
    a rearwardly projecting portion that extends rearward from an end of the first arm that is opposite from the front end; and
    a projection formed on the rearwardly projecting portion.

14. The tool of claim 13, wherein the handle extends rearwardly at an angle from an end of the first arm of the U-shaped main body.

15. The tool of claim 13, wherein the projection ends in a rounded knob.

16. The tool of claim 13, wherein the rearwardly projecting portion extends from the end of the first arm in a direction toward the second arm.

17. The tool of claim 13, wherein the rearwardly projecting portion extends from the end of the first arm in a direction away from the second arm.

18. The tool of claim 13, wherein the handle joins the first arm of the U-shaped main body at a central portion of the U-shaped main body.

19. A tool to be used by a hunter for cutting, breaking or crushing a bone of a game animal, comprising:
    a U-shaped main body having first and second arms of approximately equal length joined by a front end;
    a handle that projects at an angle from a central portion of the U-shaped main body; and
    a projection that extends rearward from an end of the first arm that is opposite from the front end.

* * * * *